US011318464B2

(12) United States Patent
Hu et al.

(10) Patent No.: US 11,318,464 B2
(45) Date of Patent: May 3, 2022

(54) AUTOMATED MACHINE FOR SORTING OF BIOLOGICAL FLUIDS

(71) Applicant: International Business Machines Corporation, Armonk, NY (US)

(72) Inventors: Huan Hu, Yorktown Heights, NY (US); Michael A. Pereira, Westchester, NY (US); Joshua T. Smith, Croton-on-Hudson, NY (US); Benjamin H. Wunsch, Mt. Kisco, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 299 days.

(21) Appl. No.: 16/559,784

(22) Filed: Sep. 4, 2019

(65) Prior Publication Data

US 2019/0388891 A1 Dec. 26, 2019

Related U.S. Application Data

(62) Division of application No. 15/434,985, filed on Feb. 16, 2017, now Pat. No. 10,471,425.

(51) Int. Cl.

*G01N 15/10* (2006.01)
*B01L 3/00* (2006.01)
*B01L 9/00* (2006.01)

(52) U.S. Cl.

CPC ......... *B01L 3/502715* (2013.01); *B01L 9/527* (2013.01); *B01L 2200/027* (2013.01); *B01L 2200/028* (2013.01); *B01L 2300/0627* (2013.01); *B01L 2300/0809* (2013.01); *B01L 2300/14* (2013.01); *B01L 2400/0487* (2013.01)

(58) Field of Classification Search

None

See application file for complete search history.

(56) References Cited

U.S. PATENT DOCUMENTS

| | | | |
|---|---|---|---|
| 6,808,075 | B2 | 10/2004 | Böhm et al. |
| 7,735,652 | B2 | 6/2010 | Inglis et al. |
| 8,304,230 | B2 | 11/2012 | Toner et al. |
| 8,579,117 | B2 | 11/2013 | Loutherback et al. |
| 9,333,510 | B2 | 5/2016 | Carlo et al. |

(Continued)

FOREIGN PATENT DOCUMENTS

| | | | |
|---|---|---|---|
| CA | 2991045 | A1 | 1/2017 |
| CN | 101255861 | A | 9/2008 |

(Continued)

OTHER PUBLICATIONS

Merriam-Webster definition of “cartridge” (Year: 2021).*

(Continued)

*Primary Examiner* — Paul S Hyun

(74) *Attorney, Agent, or Firm* — Cantor Colburn LLP; Kristofer Haggerty

(57) ABSTRACT

A technique relates to a machine for sorting. A removable cartridge includes a nanofluidic module. The removable cartridge includes an input port and at least two output ports. The nanofluidic module is configured to sort particles in a sample fluid. A holder is configured to receive the removable cartridge. A pressurization system is configured to couple to the input port of the removable cartridge. The pressurization system is configured to drive the sample fluid into the nanofluidic module for separation to the at least two output ports.

13 Claims, 13 Drawing Sheets

(56) References Cited

U.S. PATENT DOCUMENTS

| | | | | |
|---|---|---|---|---|
| 2002/0159919 | A1* | 10/2002 | Churchill | G01N 35/1002 422/400 |
| 2004/0211077 | A1 | 10/2004 | Schwichtenberg et al. | |
| 2006/0169642 | A1 | 8/2006 | Oakey et al. | |
| 2006/0269446 | A1 | 11/2006 | Gilbert et al. | |
| 2007/0090026 | A1 | 4/2007 | Han et al. | |
| 2012/0214167 | A1 | 8/2012 | Thomson et al. | |
| 2012/0258459 | A1 | 10/2012 | Huang et al. | |
| 2013/0115607 | A1 | 5/2013 | Nielsen et al. | |
| 2014/0190903 | A1 | 7/2014 | Huang | |
| 2014/0213487 | A1* | 7/2014 | Freudenthal | B01L 3/50857 506/39 |
| 2015/0202356 | A1 | 7/2015 | Gifford | |
| 2016/0047834 | A1 | 2/2016 | Nugent et al. | |
| 2016/0139012 | A1 | 5/2016 | D'Silva et al. | |
| 2016/0144361 | A1 | 5/2016 | Astier et al. | |
| 2016/0144378 | A1 | 5/2016 | Huang et al. | |
| 2016/0144406 | A1 | 5/2016 | Astier et al. | |
| 2016/0320389 | A1 | 11/2016 | Astier et al. | |
| 2017/0113221 | A1* | 4/2017 | Hoffman | B01L 3/527 |
| 2018/0111830 | A1 | 4/2018 | Wild et al. | |
| 2018/0231576 | A1 | 8/2018 | Hu et al. | |

FOREIGN PATENT DOCUMENTS

| | | | |
|---|---|---|---|
| CN | 101305087 | A | 11/2008 |
| CN | 103727021 | A | 4/2014 |
| CN | 103755777 | A | 4/2014 |
| CN | 103834558 | A | 6/2014 |
| CN | 104136596 | A | 11/2014 |
| CN | 105062866 | A | 4/2016 |
| CN | 105062866 | B | 4/2016 |
| CN | 105861297 | A | 8/2016 |
| CN | 106290160 | A | 1/2017 |
| EP | 2124036 | A1 | 11/2009 |
| EP | 2119503 | B1 | 4/2015 |
| KR | 1020160123305 | A | 10/2016 |
| KR | 1020160123307 | A | 10/2016 |
| WO | 2007035498 | A2 | 3/2007 |
| WO | 2016083975 | A1 | 6/2016 |
| WO | 2016176505 | A1 | 11/2016 |

OTHER PUBLICATIONS

"Design and Implementation of the Sorter Control System"; English Abstract; Dalian University of Technologyl Masteral Dissertation; Dec. 15, 2008; 69p.

"Research on the deterministic lateral displacement structure microfluidic cgip used in rapid isolation of circulating tumor cells"; English Abstract; Jun. 9, 2013; 72p.

Civin et al. "Automated Leukocyte Processing by Microfluidic Deterministic Lateral Displacement"; Cytometry Part A; ISAC; 89A: 1073-1083; Nov. 22, 2016; 12pages.

Elveflow Plug & Play Microfluidics, http://www.elveflow.com/microfluidic-tutorials/cell-biology-imaging-reviews-and-tutorials/microfluidic-for-cell-biology/label-free-microfluidic-cell-separation-and-sorting-techniques-a-review/, Published Apr. 30, 2015, pp. 1-10.

Huang, L. R. et al. Continuous particle separation through deterministic lateral displacement, 304, p. 987, 2004.

Inglis, "Microfluidic Devices for Cell Separation," A Dissertation Presented to the Faculty of Princeton University in Candidacy for the Degree of Doctor of Philosophy, Sep. 2007, pp. 1-99.

Laki et al., "Microvesicle Fractionation using Deterministic Lateral Displacement Effect", Nano/Micro Engineered and Molecular Systems, Hawaii, Apr. 13-16, 2014, pp. 1-4.

Li et al., "On-Chip Continuous Blood Cell Subtype Separation by Deterministic Lateral Displacement", Nano/Micro Engineered and Molecular Systems, Bangkok, Thailand, Jan. 16-19, 2007, pp. 1-5.

List of IBM Patents or Patent Applications Treated as Related; Appendix P; Date Filed: Sep. 1, 2019, 2 pages.

PCT/IB2018/050422 International Search Report and Written Opinion, dated May 30, 2018.

Sony Biotechnology Inc., FX500 Exchangeable Fluidics Cell Sorter, http://www.sonybiotechnology.com/fx500/index.php. Published Jun. 19, 2016, p. 1.

Yamada et al., Bio-Particle Sorting Employing Hydrodynamic Rectification in a Microfluidic Circuit, IEEE, Jan. 2006, pp. 1-4.

Zheng et al., "Deterministic lateral displacement MEMS device for continuous blood cell separation," IEEE, 2005, pp. 1-4.

International Search Report; International Application No. 201880010116.X; International Filing Date: Jan. 24, 2018; dated Jan. 12, 2021; 12 pages.

International Search Report; International Application No. JP 2019-543215; International Filing Date:Jan. 24, 2018; dated May 28, 2021 ; 4 pages.

Reply to Examination Report; International Application No. 1911665.6; International Filing Date: Jan. 24, 2018; dated Jan. 7, 2022; 2 pages.

* cited by examiner

AUTOMATED MACHINE FOR SORTING OF BIOLOGICAL FLUIDS

DOMESTIC PRIORITY

This application is a divisional of U.S. patent application Ser. No. 15/434,985, filed Feb. 16, 2017, the disclosure of which is incorporated by reference herein in its entirety.

BACKGROUND

The present invention relates generally to sorting, and more specifically, to methods and machines for automated sorting of biological fluids.

The separation and sorting of biological entities, such as cells, proteins, deoxyribonucleic acid (DNA), ribonucleic acid (RNA), etc., is important to a vast number of biomedical applications including diagnostics, therapeutics, cell biology, and proteomics.

SUMMARY

According to embodiments of the present invention, an apparatus is provided. The apparatus includes a removable cartridge including a nanofluidic module. The removable cartridge includes an input port and at least two output ports. The nanofluidic module is configured to sort a sample fluid. A holder is configured to receive the removable cartridge, and a pressurization system configured to couple to the input port of the removable cartridge, the pressurization system being configured to drive the sample fluid into the nanofluidic module for separation to the at least two output ports.

According to embodiments of the present invention, a method of configuring an apparatus is provided. The method includes providing a removable cartridge including a nanofluidic module. The removable cartridge includes an input port and at least two output ports, and the nanofluidic module is configured to sort a sample fluid. The method include positioning the removable cartridge in a holder, and coupling a pressurization system to the input port of the removable cartridge. The pressurization system is configured to drive the sample fluid into the nanofluidic module for separation to the at least two output ports.

According to embodiments of the present invention, an automated machine for separating sample fluid is provided. The machine includes a removable cartridge including a nanofluidic module. The removable cartridge including an input port and at least two output ports, and the nanofluidic module is configured to sort the sample fluid. The machines includes a holder configured to receive the removable cartridge, and a pressurization system configured to couple to the input port of the removable cartridge. The pressurization system is configured to drive the sample fluid into the nanofluidic module for separation to the at least two output ports. Further, the machine includes a controller configured to automatically control pressure in the removable cartridge by controlling the pressurization system according to operating parameters. The controller is configured to receive the operating parameters from a user interface.

According to embodiments of the present invention, a method of configuring an automated machine for separating sample fluid is provided. The method includes providing a removable cartridge including a nanofluidic module. The removable cartridge includes an input port and at least two output ports, and the nanofluidic module is configured to sort the sample fluid. The method includes providing a holder configured to receive the removable cartridge, and providing a pressurization system configured to couple to the input port of the removable cartridge. The pressurization system is configured to drive the sample fluid into the nanofluidic module for separation to the at least two output ports. Further, the method includes providing a controller configured to automatically control pressure in the removable cartridge by controlling the pressurization system according to operating parameters. The controller is configured to receive the operating parameters from a user interface.

According to embodiments of the present invention, a method of operating an automated machine for separating sample fluid is provided. The method includes receiving insertion a removable cartridge into a holder, once protective packaging has been removed from the removable cartridge, and receiving the sample fluid at an input port of the removable cartridge. Also, the method includes receiving, by a user interface, input of operating parameters, where the operating parameters are selected from the group consisting of flow rate, run time, and pressure set point. The method includes processing the sample fluid, and the processing includes starting, by a controller, a receiving insertion pump to pressurize the removable cartridge, and monitoring, by a pressure sensor, a pressure of the removable cartridge such that a value of the pressure is fed to the controller. The processing includes in response to the value of the pressure dropping below a predefined threshold, restarting, by the controller, the pump to restore the pressure, and in response to a predefined time, alerting a user that processing of the sample fluid is complete such that the removable cartridge is available for removal.

DETAILED DESCRIPTION

Figure 1A:
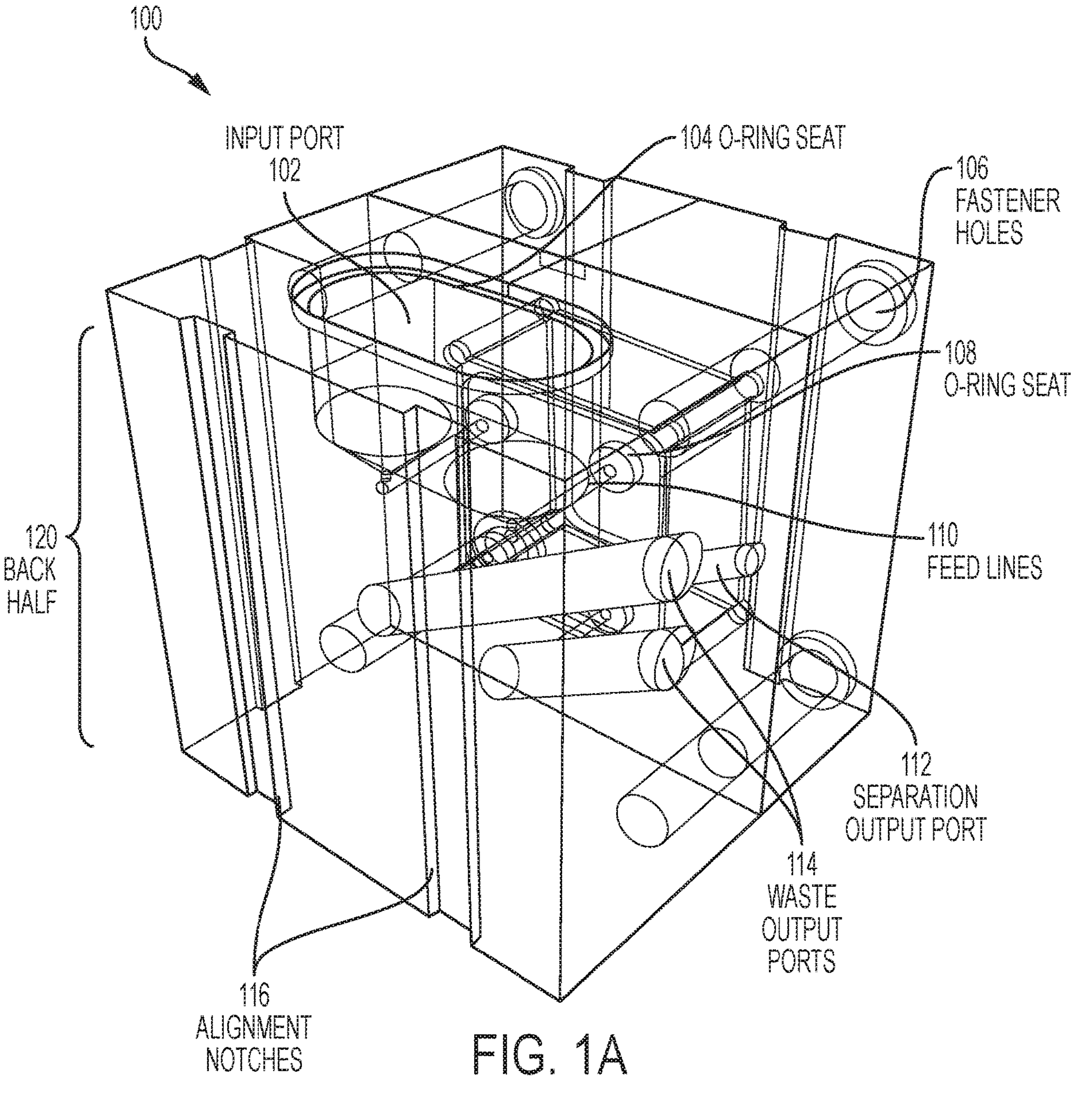
FIG. 1A is a schematic of a cartridge utilized in an automated machine according to embodiments of the invention.

Various embodiments of the invention are described herein with reference to the related drawings. Alternative embodiments of the invention can be devised without departing from the scope of this document. It is noted that various connections and positional relationships (e.g., over, below, adjacent, etc.) are set forth between elements in the following description and in the drawings. These connections and/or positional relationships, unless specified otherwise, can be direct or indirect, and are not intended to be limiting in this respect. Accordingly, a coupling of entities can refer to either a direct or an indirect coupling, and a positional relationship between entities can be a direct or indirect positional relationship. As an example of an indirect positional relationship, references to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s).

The descriptions of the various embodiments of the present invention have been presented for purposes of illustration, but are not intended to be exhaustive or limited to the embodiments discussed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments discussed herein.

The term "about" and variations thereof are intended to include the degree of error associated with measurement of the particular quantity based upon the equipment available at the time of filing the application. For example, "about" can include a range of ±8% or 5%, or 2% of a given value.

Sorting in the micron ($10^{-6}$) range has been demonstrated using Si-based Lab-on-a-Chip approaches. Additional information in this regard is further discussed in a paper entitled "Hydrodynamic Metamaterials: Microfabricated Arrays To Steer, Refract, And Focus Streams Of Biomaterials" by Keith J. Morton, et al., in PNAS 2008 105 (21) 7434-7438 (published ahead of print May 21, 2008). The paper "Hydrodynamic Metamaterials: Microfabricated Arrays To Steer, Refract, And Focus Streams Of Biomaterials" discusses that their understanding of optics came from viewing light as particles that moved in straight lines and refracted into media in which the speed of light was material-dependent. The paper showed that objects moving through a structured, anisotropic hydrodynamic medium in laminar high-Peclet-number flow move along trajectories that resemble light rays in optics. One example is the periodic microfabricated post array known as the deterministic lateral displacement (DLD) array, which is a high-resolution microfluidic particle sorter. This post array is asymmetric. Each successive downstream row is shifted relative to the previous row so that the array axis forms an angle $\alpha$ relative to the channel walls and direction of fluid flow. During operation, particles greater than some critical size are displaced laterally at each row by a post and follow a deterministic path through the array in the so-called "bumping" mode. The trajectory of bumping particles follows the array axis angle $\alpha$. Particles smaller than the critical size follow the flow streamlines, weaving through the post array in a periodic "zigzag" mode.

Purification of colloidal material in biology and medicine is ubiquitous to all forms of synthesis, diagnostics, treatment and research. Bio-colloids such as macromolecules (protein, nucleic acids, polysaccharides, and protein complexes), vesicles (exosomes, extracellular vesicles, synaptic vesicles, and oncosomes), viruses, cellular organelles, and spores are all separated for processing from complex fluids by some form of purification. The main forms of purification in wide-spread use in medicine, research, and industry include chromatography (e.g., HPLC, FPLC, SEC), magnetic bead-based separation, gel electrophoresis, filtration and ultracentrifugation (UC). These methods fall within five major drawbacks: (1) high cost equipment and technical expertise (HPLC, UC), cross-contamination (filtration, gels), batch processing (gels, HPLC, UC, and filtration), long processing times (UC, HPLC, and gel), or poor resolution (gels, filtration). Except for UC, all of these methods rely on porous media with polydispersity properties that lead to dispersion in the size separation capability of the technique. UC depends on generating a pseudo-force strong enough to effect sedimentation of nanoscopic particles, and this requires substantial energy and time. Filtration is generally economical and fast, but can require high energy input to drive particulates through the filter medium, and lead to finite capacity due to the inherent clogging of the material (hence high loss of sample).

Nanostructured media such as nanoDLD arrays with well-defined designs and operating parameters lead to higher precision separation profiles. In addition, a nanoDLD array separates particles through a continuous flow process with single particle resolution, yielding a medium with longer service life and processing economy. To harness the capability of nanoDLD, a separation technique in a working device that allows user interfacing is needed. Embodiments of the invention are configured to address this issue by providing a separation system for biology, chemistry, and material science applications.

Embodiments of the invention provide structures and methods, which can be implemented in several types of devices. The devices are for injecting a solution of colloids into a nanofluidic or microfluidic network, separating the colloids based on a selection criterion (e.g., size or surface chemistry), and collecting the purified material for further processing or assays. Embodiments of the invention improve over the state-of-the-art (such, e.g., ultracentrifugation, high pressure chromatography, etc.) by allowing continuous processing of sample solutions and requiring greatly reduced complexity of the system, providing economy and simplicity of implementation.

Embodiments provide a device that uses a core module formed from parallel arrays of nano-deterministic lateral displacement (DLD) networks that can separate colloids based on size down to 20 nanometers (nm) or lower. The design of the nanoDLD network inside the nanoDLD module allows selection of the size of particle that is separated. The nanoDLD module provides enough fluid flux to provide processing at clinical and research relevant scales/times of 1 milliliter/hour (mL/hr.) or more.

Embodiments of the invention provide an automated structure/machine that consists of a device for separating separates colloids, based on size, into two or more output streams, each with a range of sizes (binning). The device consists of a nanofluidic module capable of separating colloids, e.g., using a nanoDLD array embedded in a disposable cartridge. The automated machine can be utilized by an operator, with very little training, directly in the setting that needs the separated colloids. Accordingly, embodiments do not require a highly trained biologist, chemist, biochemist, etc., to operate the automated machine. Moreover, the automated machine provides simplicity in its operation such that the operator is not required to understand the inner workings of the automated machine.

Figure 1B:
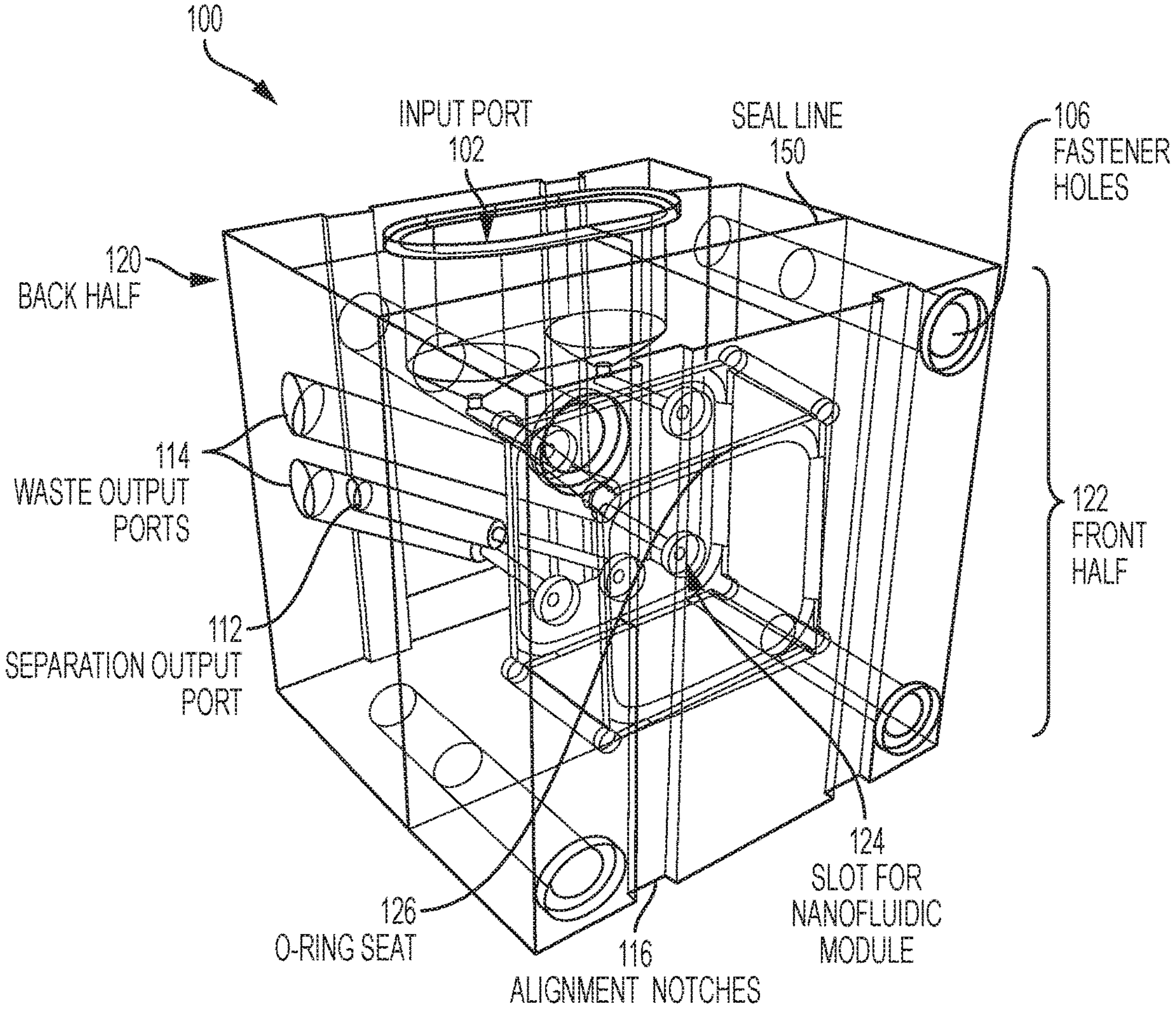
FIG. 1B is a schematic of another view of the cartridge according to embodiments of the invention.
Figure 2:
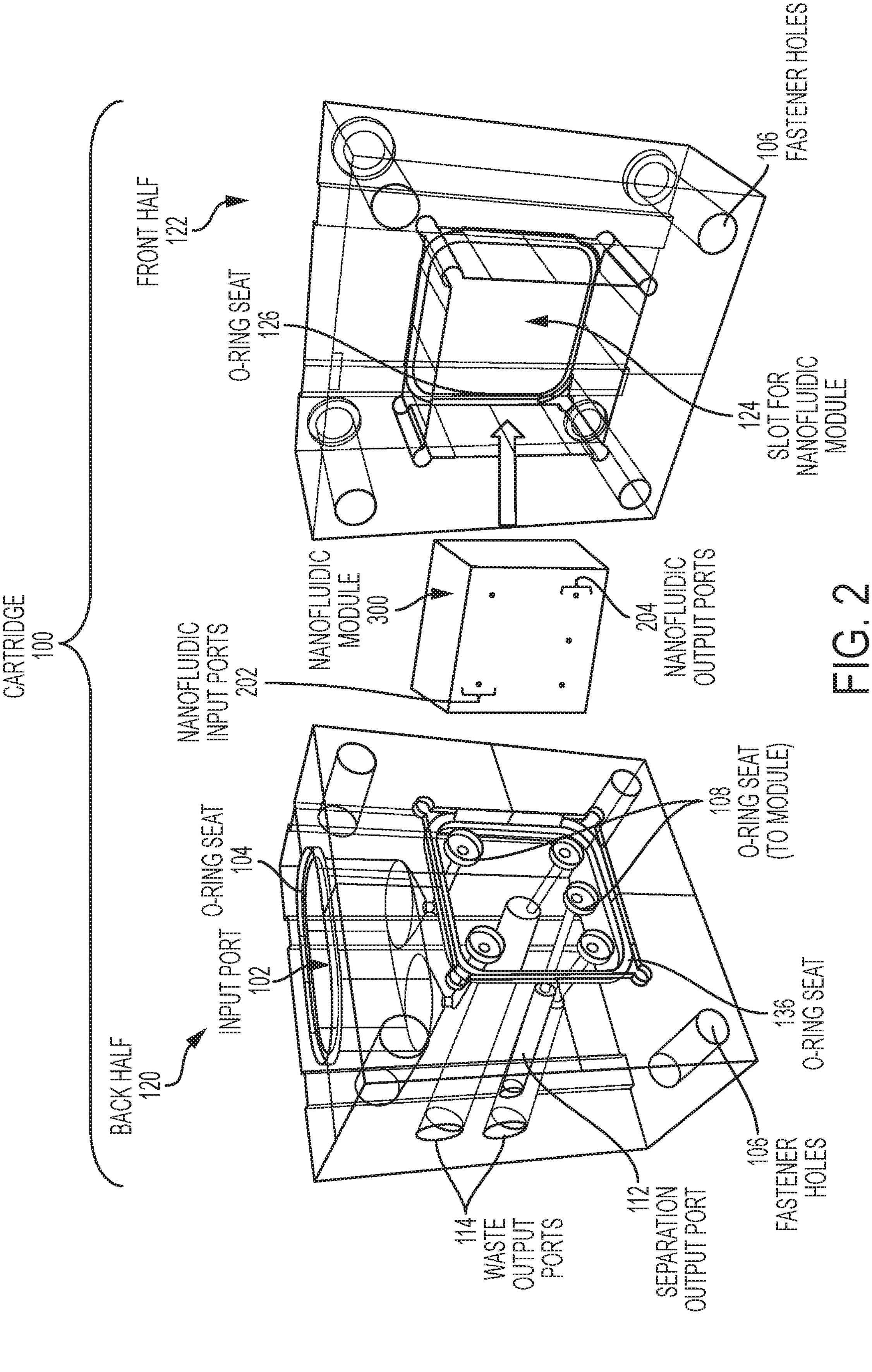
FIG. 2 is a schematic illustrating the cartridge disassembled into two halves according to embodiments of the invention.
Figure 3:
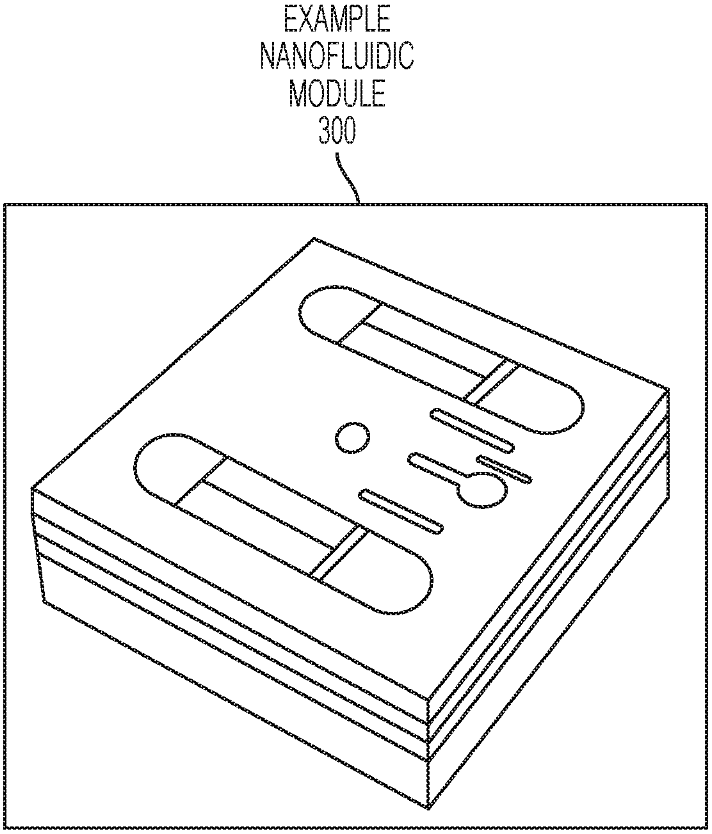
FIG. 3 is a schematic of a nanofluidic module that fits inside of the cartridge according to embodiments of the invention.

FIG. 1A is a schematic of a cartridge 100 utilized in the automated machine according to embodiments. FIG. 1B is a schematic of another view of the cartridge 100 according to embodiments. FIG. 2 is a schematic illustrating the cartridge 100 disassembled into two halves according to embodiments. FIG. 3 is a schematic of a nanofluidic module 300 inside of the cartridge 100 according to embodiments.

Figure 4:
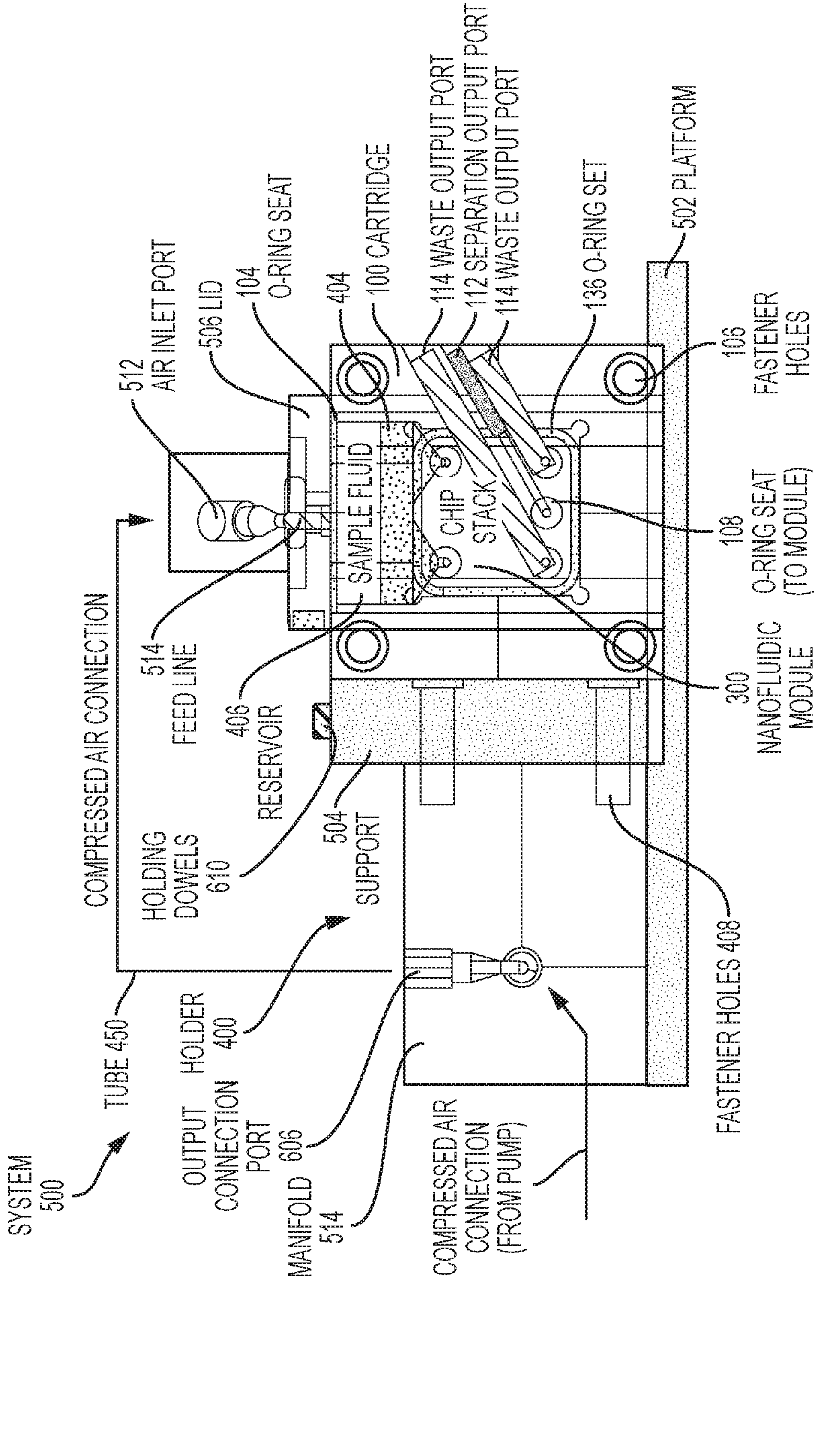
FIG. 4 is a cross-sectional view of the automated machine illustrating the holder with the cartridge inserted according to embodiments of the invention.
Figure 5:
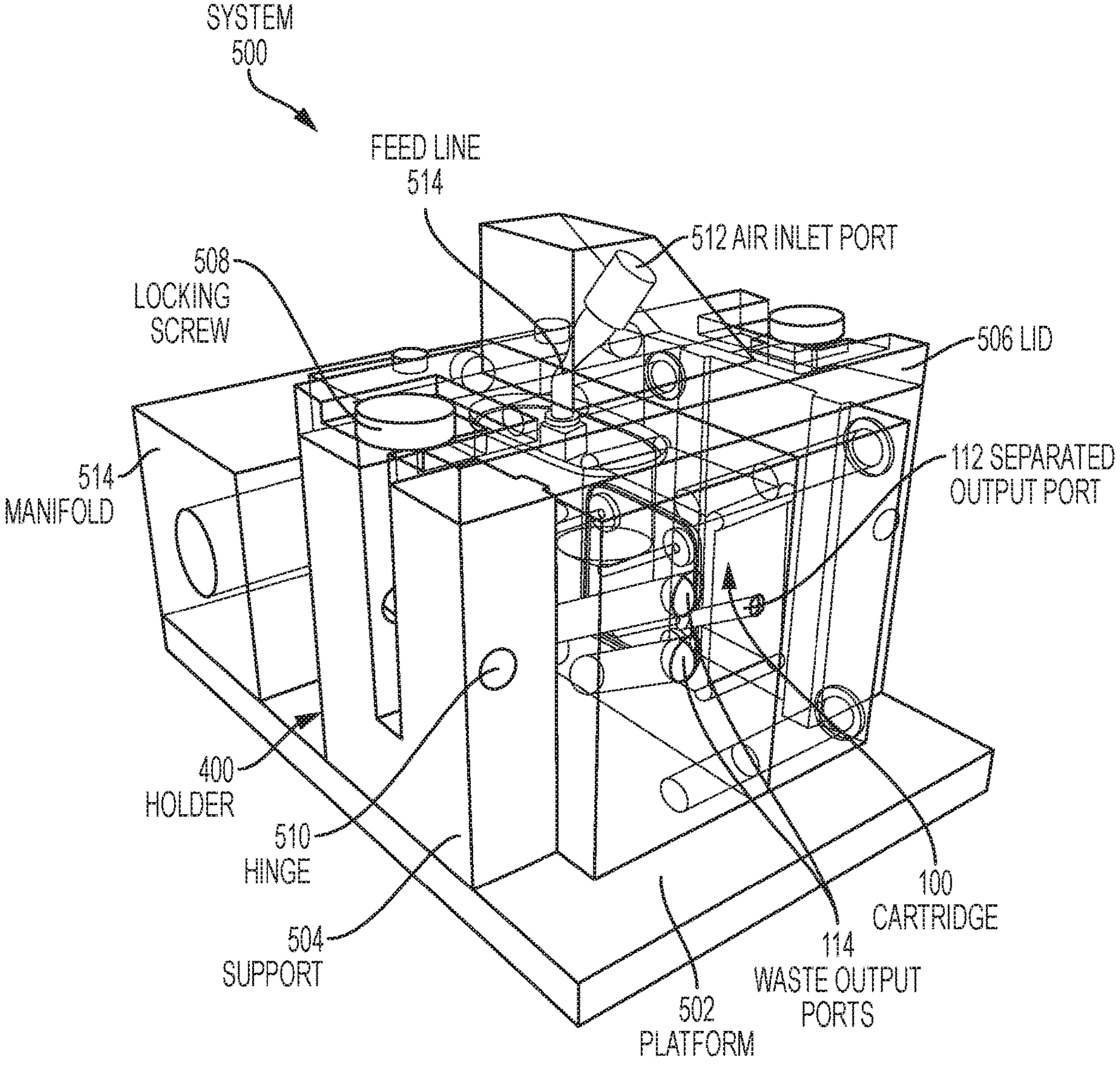
FIG. 5 is a schematic of the automated machine illustrating the holder 400 with the cartridge inserted according to embodiments of the invention.
Figure 6:
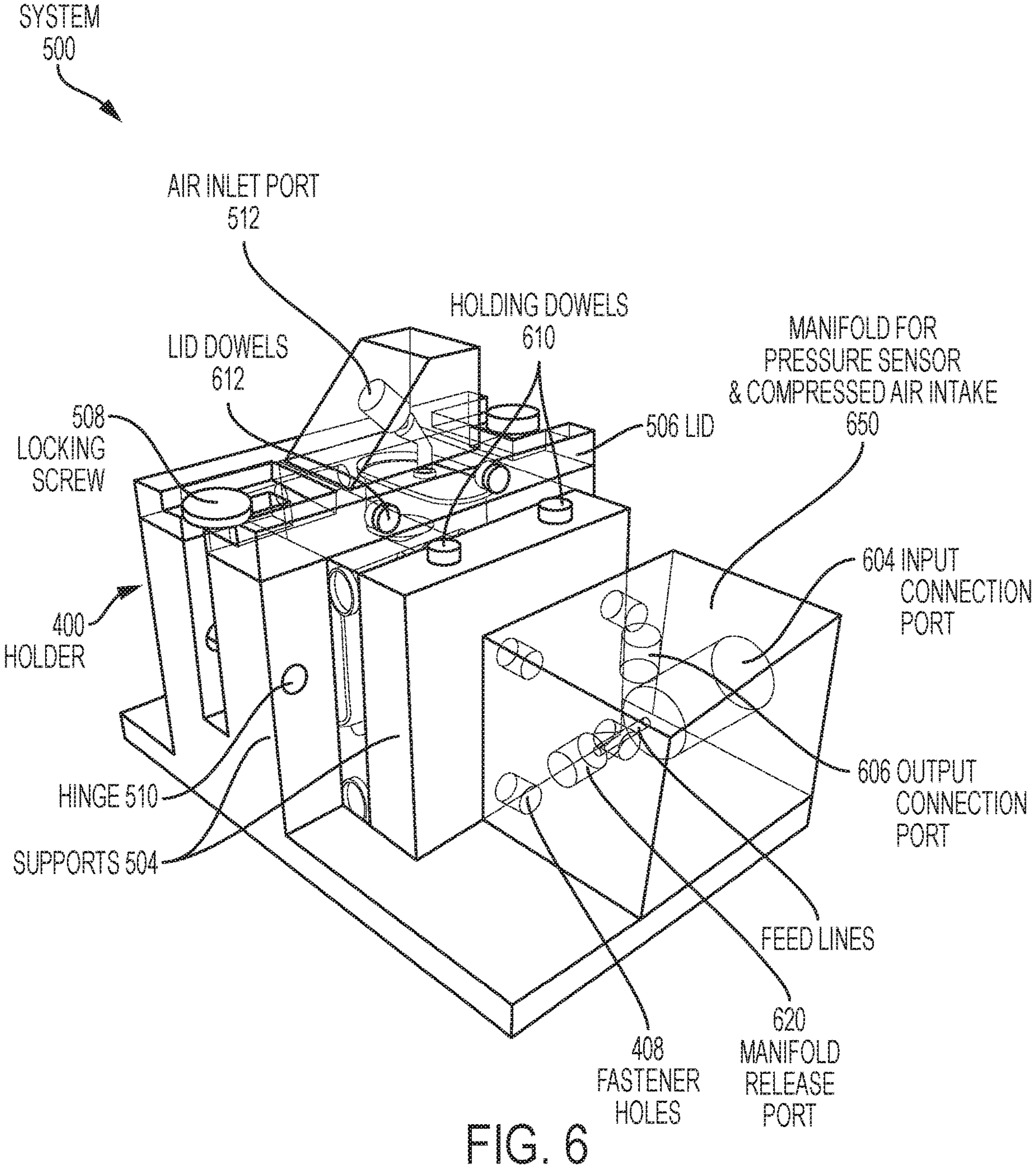
FIG. 6 is a schematic of another view of the automated machine illustrating the holder with the cartridge inserted according to embodiments of the invention.

The cartridge 100 is insertable into and removable from a holder 400 (shown in FIGS. 4, 5 and 6). In some embodiments, the cartridge 100 is disposable. After running the automated machine 500, the operator can extract the separated colloids and dispose of the cartridge 100 in a manner consistent with, for example, disposal of other biological or biomedical waste. The cartridge 100 can be made of plastic, ceramic, composite, metal (such as steel or aluminum), etc. In some cases, a sterilization process can be performed on the cartridge 100 such that the cartridge 100 can be utilized again.

The cartridge 100 has ports for accepting input fluid (for example, the sample to be separated) and collecting output fluid (the separated fractions). In this example, the cartridge 100 has one input fluid port 102 and three output fluid ports denoted as (one) separation output port 112 and (two) waste output ports 114. The input fluid port 102 connects to a reservoir 406 for holding sample fluid 404 (in FIG. 4). Although three output ports 112 and 114 are shown, the cartridge 100 only needs two output ports, one for waste fluid and one for the separated/good fluid (separation output port 112).

The input fluid port 102 plumbs through channel(s) into the input(s) of nanofluidic module 300, while the output fluid ports 112 and 114 plumb through channels into the outputs of the nanofluidic module 300. The input fluid port 102 and output fluid ports 112 and 114 are positioned upright and/or at angles to prevent spillage as fluid is processed. The input fluid port 102 provides input to the nanofluidic module 300 before separation, while the output fluid ports 112 and 114 receive output from the nanofluidic module after separation.

Sealing material such as, for example, membranes, gaskets, O-rings, etc., are on each port connection with the nanofluidic module 300 in order to provide air tight seals. That is, air tight seals are made between the cartridge 100 and the nanofluidic module 100. In this example, five O-ring seats 108 are shown and the O-ring seats 108 are configured to hold O-rings that seal/connect to ports of the nanofluidic module 300. For the sake of clarity, no O-rings are shown in the O-ring seats. FIG. 2 illustrates that the two top O-ring seats 108 match the two nanofluidic input ports 202 on the nanofluidic module 300, while the three bottom O-ring seats 108 match three nanofluidic output ports 204 on the nanofluidic module 300. The cartridge 100 can be made of a back half 120 and a front half 122. The nanofluidic module 300 can be placed in the nanofluidic module slot 124 in the front half 122 as shown in FIG. 2. The back half 120 and front half 122 can be closed together such that the inputs and outputs (e.g., nanofluidic input ports 202 and nanofluidic output ports 204) of the nanofluidic module 300 align with the internal plumbing (i.e., channels inside the cartridge 100) connected to the input fluid port 102 and the output fluid ports 112 and 114. For example, FIG. 1 shows example O-ring seats 104, 108, 126 in which O-rings (or other sealing material) can sit to provide a tight seal between interfaces. The O-ring seats 108 connect to the nanofluidic module 300 on one side, while the other side can connect to feed lines 110 that plumb (i.e., connect) to the input fluid port 102. Other feed lines plumb to the output fluid ports 112 and 114.

As one example of connecting the back half 120 to the front half 122, fasteners holes 106 are provided in both the back and front halves 120 and 122. Fasteners can be inserted through fastener holes 106 to tightly seal the back half 120 to the front half 122 of the cartridge 100, such that the O-rings in O-ring seats 108 align to the inputs and outputs of the nanofluidic module 300. Similarly, O-rings in O-ring seats 126 and 136 tightly seal to the front and back sides of the nanofluidic module 300. In this example, the fasteners can be screws that tightly seal the back half 120 to the front half 122. In other examples, adhesives can be utilized to seal the back half 120 to the front half 122. A seal line 150 is depicted to show one half from the other half in FIG. 1B. It should be appreciated that the exact configuration of the halves of the cartridge 100 can be modified as desired, or even reversed. The cartridge 100 can be constructed in other manners, for example, in which the nanofluidic module 300 is laminated between several layers of material to form a composite cartridge, or with direct fabrication of the nanofluidic module 300 into one half of the cartridge 100. Fasteners can be reversible (e.g., screws, pins) or irreversible (e.g., chemical adhesion, welding, lamination). The cartridge 100 can consist of several layers/components, forming several compartments for mounting several nanofluidic modules 300 into a single unit.

The cartridge 100 can also contain any additional electronics, sensors, indicators, sterile barriers, and/or anti-tampering measures desired for function. The cartridge 100 can have alignment notches 116 to ensure proper alignment in the holder 400.

FIG. 4 is a cross-sectional view of the automated machine 500 illustrating the holder 400 with the cartridge 100 inserted according to embodiments. FIG. 5 is a schematic of the automated machine 500 illustrating the holder 400 with the cartridge 100 inserted according to embodiments. FIG. 6 is a schematic of another view of the automated machine 500 illustrating the holder 400 with the cartridge 100 inserted according to embodiments.

Figure 8:
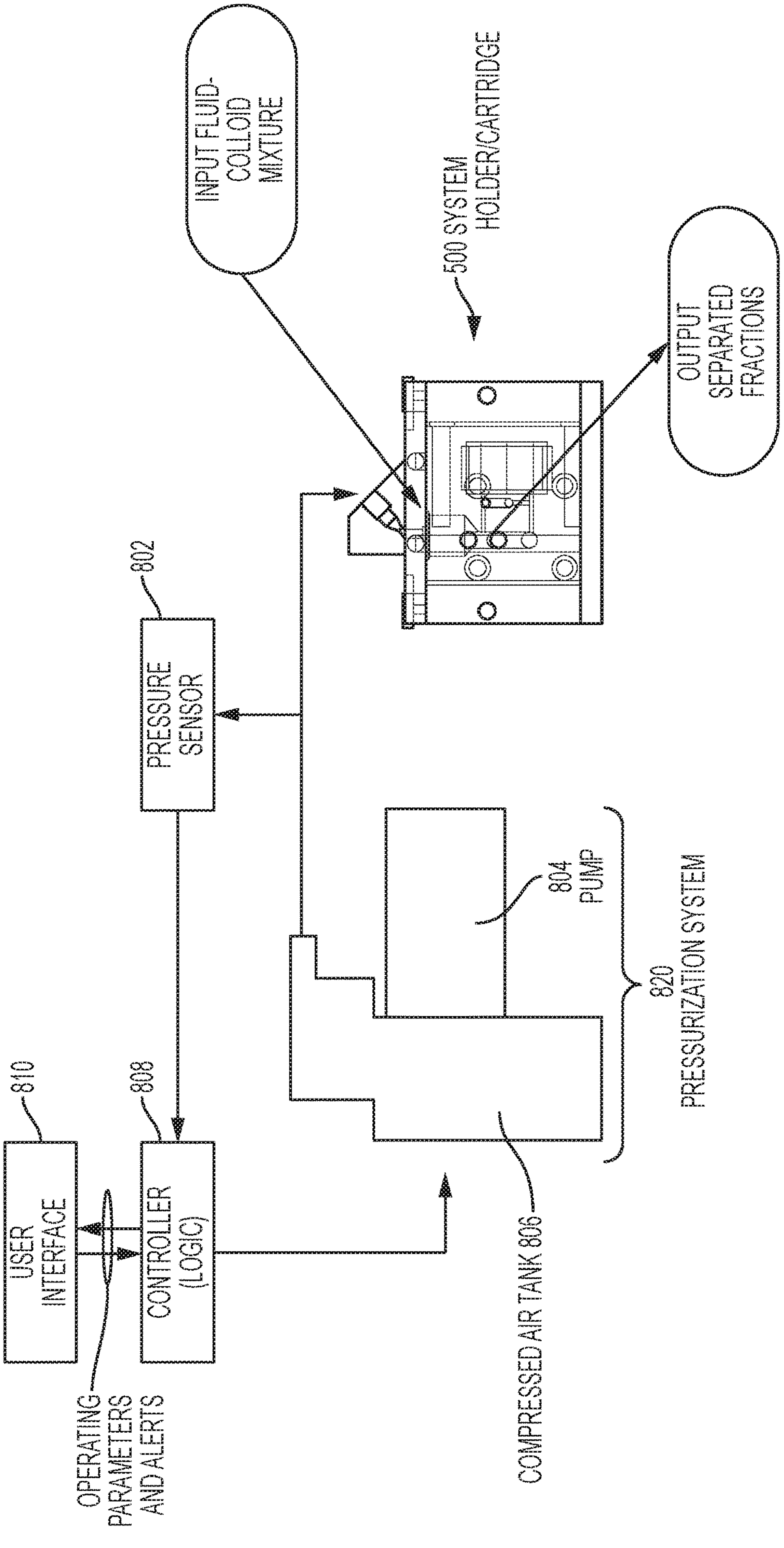
FIG. 8 is a schematic of the control and feedback loop for operation according to embodiments of the invention.

The cartridge 100 loads into the holder 400 which secures the cartridge 100 rigidly in place, and provides an interface (via the air inlet port 512 of the top lid 506) between the cartridge 100 and an air compressor pump 804 (in FIG. 8). The holder interface in general consists of a channel (e.g., including feed line 514, sealing material, etc.) with appropriate fittings, to provide an air-tight seal between the pump inlet tube 512 and the cartridge 100. Sealing material on the holder interface (air inlet port 512 of the top lid 506) produces an air-tight seal over the input port 102 of cartridge 100. The compressor pump 804 produces a drive pressure on the input port side (via input port 102) of the cartridge 100, such that the drive pressure pushes the sample fluid 404 into the nanofluidic module 300 (via nanofluidic input ports 202). By the drive pressure pushing the sample fluid 404 into and through the nanofluidic module 300, the sample fluid 404 is processed and then emitted from the nanofluidic module 300 (via nanofluidic output ports 204) into the respective output fluids ports 112 and 114 of the cartridge

100. The magnitude of the drive pressure from the compressor pump 804 determines the flow rate of sample through the nanofluidic module 300. In one implementation, a (in-line) pressure sensor 802 monitors the set pressure in the cartridge 100. This signal from the pressure sensor 802 feeds back to a controller 808 which can adjust the pump rate of the pump 804 in order to tune the pressure back to set point. The controller 808 can be a microcontroller, a computer with processor and memory, etc. A user interface 810 is configured to allow the operator to set the pressure and monitor the time progression of the fluid processing in the automated machine 500. The user interface 810 can be a graphical touch screen, a liquid crystal display (LCD) screen with touch capability, control knobs, and/or a keyboard which allows the operator to input commands for interacting with the system 500.

The design of the automated machine 500 is configured such that only the cartridge 100 is exposed to the sample fluid 404. The isolation of the holder 400 and pump 804 from the cartridge 100 eliminates cross-contamination issues, because only the cartridge 100 comes into contact with sample fluid 404. The holder 400 never touches any parts which contact the fluid 404. Once the sample 404 is separated (i.e., flowing through the nanofluidic device 300 of the cartridge 100), the individual separated fractions can be removed from the cartridge 100 (via the separation output port 112 and the waste output ports 114), and the cartridge 100 removed from the holder 400 and disposed of. This isolation of the cartridge 100 from the holder 400 and pump 804 allows for other cartridges 100 to be utilized to separate other sample fluids 404 without the holder 400 and pump 804 (of the automated machine 500) being contaminated from previous processing (i.e., separation of sample fluid 404) of the previously removed cartridge 100.

The automated machine 500 can include additional implementations. Particle counter sensors or optics can be embedded in the nanofluidic module 300. The particle counter sensors or optics are configured to monitor the input/output particle streams on nanofluidic module 300 and give feedback on the progress of separation on the nanofluidic module 300 (on-chip). Fluid level sensors can be in the cartridge ports such as waste output ports 114, separation output port 112, and input port 102. Fluid level sensors in the cartridge ports can report on the rate of fluid transfer into and out of the nanofluidic module 300.

Fluid injectors can be included in any of the waste output ports 114 and separation output port 112 of the cartridge 100. Fluid injectors are configured to transfer aliquots of fluid from the waste output ports 114 and separation output port 112 to external auxiliary devices, such as to, for example, mass spectrometers, absorbance spectrometers, particle trackers, etc., to allow real time analysis of the output samples. These additional analyses can be fed back into the controller 808 to fine-tune operation of the pump 804. As an example, aliquots of sample can be fed into a mass spectrometer to monitor the concentration of a particular colloid. If the operating velocity within the nanofluidic network changes (e.g., due to sample viscosity or interaction with surfaces in the nanofluidic module 300), this could cause the separation conditions to change and cause contaminates to enter into the sample output. If residual colloids (contaminates) are observed in the mass spectrometer, this information can be fed back into the controller 808 and used to adjust the pressure, and hence the flow velocity, to correct out the contamination.

In some embodiments, the pump 804 can be a compressed air canister to provide compressed air. In embodiments, the pump 804 can be a chemical reaction to create compressed air/gas. It is noted that the drive pressure can be generated by liquid as opposed to air. This can be effected by using a syringe pump or piston on the sample reservoir 406 instead of the air compressor/pump 804.

To decrease the risk of contamination, a disposable sealing material (e.g. gasket, O-ring) can be included to fit on the parts of the holder 400 that contact the cartridge 100. For example, the top lid 506 sits on top of the input port 102 of the cartridge 100 so as to form a seal such that air can flow into the inlet port 512 through feed line 514 in order to enter the input port 102 of the cartridge 100. Examples of disposable sealing material could include a thin, expanded polytetrafluoroethylene O-ring or a thin layer of n-buna rubber, with structured holes, which provide compression for producing a seal and can be attached and sealed to the cartridge 100 (or provided as a separate part which is loaded onto the cartridge/holder after sample loading and prior to running the machine). After use, these materials can be disposed of with the cartridge 100, preventing any possible sample from remaining on the holder and around the air inlet port on the lid.

With reference to FIGS. 4, 5, and 6, the holder 400 of the automated machine 500 can have various designs. In one implementation, the holder 400 include platform 502 on which the cartridge 100 sits. Supports 504 hold the cartridge 100 in place and align with the alignment notches 116 on the cartridge 100 such that the operator can easily install the cartridge 100. The top lid 506 can be held in place by locking screws 508. The locking screws 508 can be connected to hinges 510 in the supports, such that the locking screws 508 can be loosened and fall to opposite sides. By loosening the screws 508, the top lid 506 can be removed. In one case, the lid 506 can be placed on holding dowels 610 during insertion and/or removal of the cartridge 100 and during input of the sample fluid 404. The lid 506 can have lid dowels 612 that are positioned to sit on the holding dowels 610 of the support 504 during cartridge replacement. When no cartridge 100 is present in the holder 400, a void or pocket is left between the supports 504 and platform 502.

A manifold 650 can be included in the automated machine 500. The manifold 650 can be utilized for pressure sensor and compressed air intake. The manifold 650 could be connected to the holder 400 by fasteners through fastener holes 408. The manifold 650 can have an input connection port 604 that receives compressed air from the pump 804. The manifold 650 can have an output connection port 606 that receives the compressed air via (internal) feed lines from the input connection port 604. The output connection port 606 is configured to pass the compressed to air inlet port 512 of the top lid 506 via, for example, tube/hose 450. The tube 450 is connected at one end to the output connection port 606 and at the other end to the air inlet port 512. The manifold 650 can include a manifold release port 620 that is configured to open and release pressure when the air pressure reaches and/or exceeds an air pressure threshold. In some cases, the automated machine 500 can be in a lab or hospital setting that has its own air pressure hookup. In this case, the input connection port 604 can be connected via a hose (not shown) to the hospital's air pressure hookup to receive air pressure to drive the automated machine 500. In this case, the valve (not shown) can been automatically opened and closed to reduce air pressure by releasing air through the manifold release port 620. The pressure sensor 802 (for example, in the manifold 650) can be connected to a relay (not shown) to open and close the valve, thereby allowing air pressure to be released through manifold release port 620. Also, the controller 808 can be configured to control the opening and closing of the valve to release air through manifold release port 620 when the air pressure reaches and/or exceeds an air pressure threshold.

The cartridge 100 can include multiple nanofluidic modules 300 in parallel or serial connection. In a serial connection, multiple nanofluidic modules 300 allow multiple processing steps. In a parallel connection, multiple nanofluidic modules 300 are configured to increase the output capacity by reducing processing time of a given sample. Each nanofluidic module 300 can affect the same separation or different size separations to allow fractionation of a single sample into several size fractions.

Figure 7B:
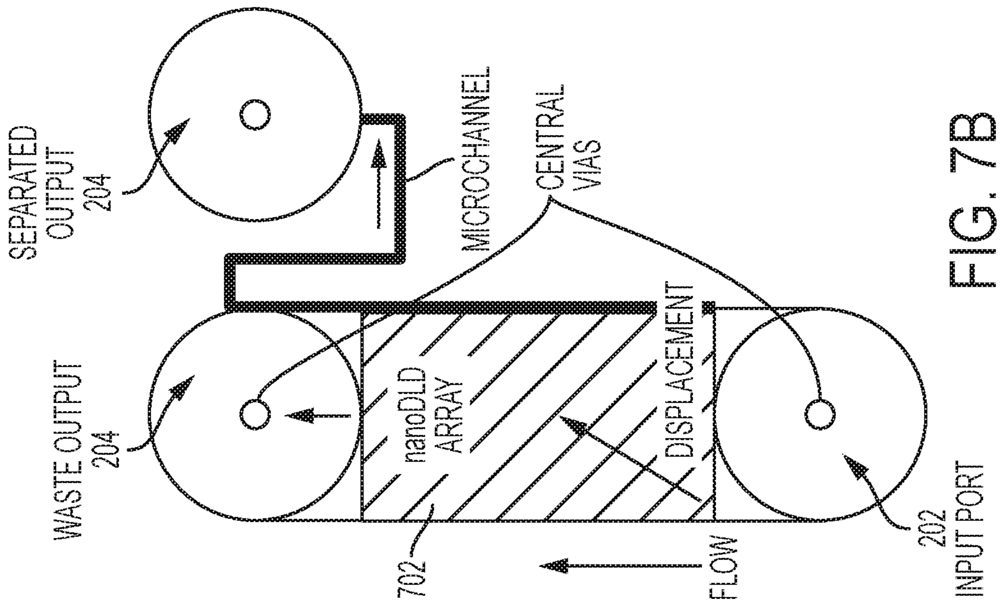
FIG. 7B is a schematic of part of the nanofluidic module illustrating one of the nano-deterministic lateral displacement (nanoDLD) arrays according to embodiments of the invention.
Figure 7A:
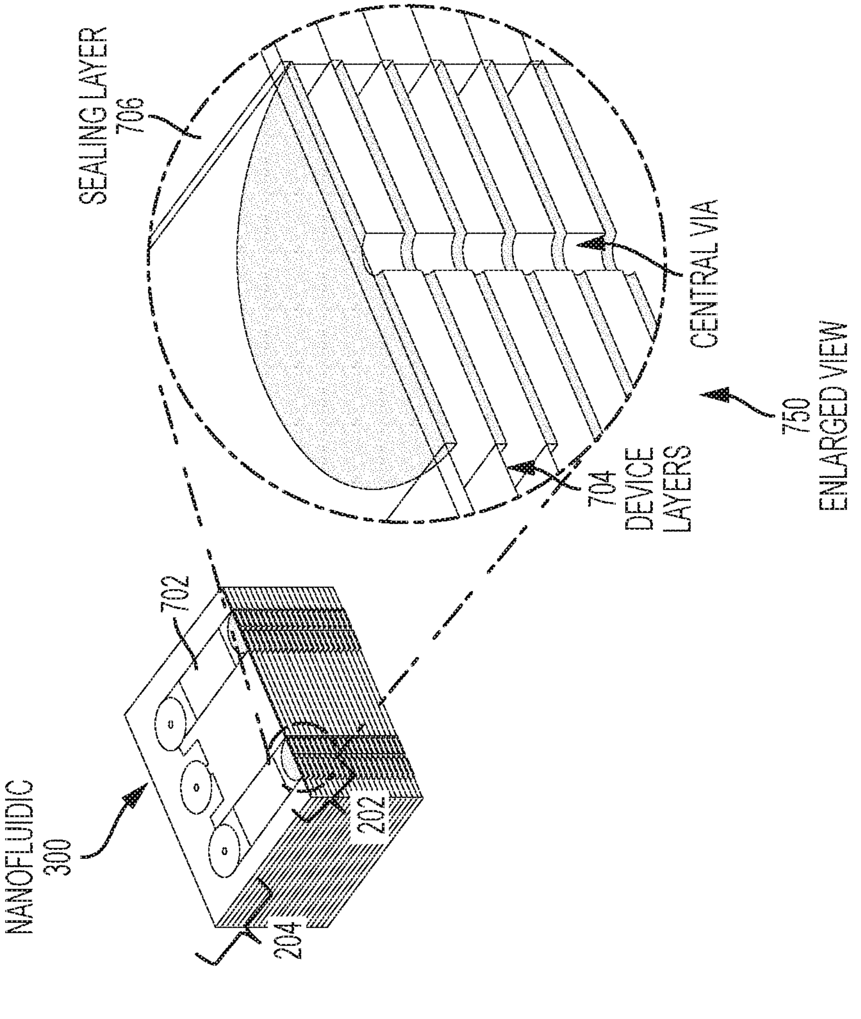
FIG. 7A is a cutaway view of the nanofluidic module according to embodiments of the invention.

FIGS. 7A and 7B illustrate an example of the nanofluidic module 300 according to embodiments. It should be appreciated that the design of the nanofluidic module 300 can vary as desired, and FIGS. 7A and 7B are provided for explanation purposes and not limitation. FIG. 7A is a cutaway view of the nanofluidic module 300 according to embodiments. FIG. 7B is a schematic of part of the nanofluidic module 300 illustrating one of the nanoDLD arrays 702 according to embodiments.

In FIG. 7A, the nanofluidic device 300 depicts a partial view of the two nanofluidic input ports 202, while illustrating the three nanofluidic output ports 204 device layers 704. The individual device layers 704 are stacked chips each having two nanoDLD arrays 702 in parallel. As seen in the enlarged view 750, each device layer 704 has a sealing layer 706 on top to prevent the sample fluid 404 from spilling. Central vias allow the sample fluid 404 to flow to each of the device layers 704 view respective nanofluidic input ports 202 and nanofluidic output ports 204. FIG. 7B illustrates the sample flow of one nanoDLD array 702 on a device layer 704 and the other nanoDLD array 702 (having the same operation) is on the same device layer 704. In FIG. 7B, the sample fluid flows through the nanofluidic input port 202 and flows through the nanoDLD array 702 in the flow direction. This particular nanoDLD array 702 is designed such that colloids/particles smaller than the critical size are output through the nanofluidic (waste) output 204 by flowing in the flow direction. However, colloids/particles equal to or larger than the critical size flow in the direction of the displacement arrow to the nanofluidic (separated) output 204 via a microchannel. Accordingly, the sample fluid 404 has been separated. At noted above, the other half of this same device layer 704 has a nanoDLD array 702 designed to perform the same operation. Both nanoDLD arrays 702 output the colloids/particles equal to or larger than the critical size flow in the direction of the displacement arrow to the same nanofluidic (separated) output 204 but output their waste output to two separate nanofluidic (waste) outputs 204 (in this design). That is why the cartridge 100 correspondingly has two waste output ports 114 and one separation output port 112. As noted above, this same operation is simultaneously performed on each of the device layer 704 in parallel.

FIG. 8 is a schematic of the control and feedback loop for operation according to embodiments. The control and feedback loop includes the user interface 810, the controller 808, a pressurization system 820, the pressure sensor 802, and the automated machine/system 500. In one implementation, the pressurization system 820 can include the pump 804 and air compressor tank 806 (and/or the pressure sensor 802).

For illustration purposes and not limitation, an example scenario of operating the machine/system 500 is provided below. A new cartridge 100 is removed from its protective packaging. The protecting packaging keeps the cartridge 100 sterile and/or in a sterile environment, until the cartridge 100 is ready for use. Each cartridge 100 comes with a nanofluidic module 300 inside. The cartridge 100 is loaded into the holder 400 and secured. The cartridge 100 can have sterile barriers on the input fluid port 102 and any sterile barriers on the input fluid port 102 are removed, revealing any required sealing materials such as, for example, an O-ring seated in the O-ring seat 104. The sterile barriers can be plastic attached (via an adhesive) to the cartridge 100 to cover the input port 102, Mylar® paper (e.g., polyester film or plastic sheet), etc.

The sample fluid 404 is added to the input fluid port 102 of the cartridge 100. The input port 102 has a reservoir 406 for holding the sample fluid 404. The sample fluid 404 can be added to the input port 102 via a syringe, pipet, and/or automated injector.

The top lid 506 of the holder 400 is closed, providing an air tight seal over the cartridge input port 102. To be processed and controlled by the controller 808, the operator selects the desired operating parameters, such as, for example, flow rate, run time, target range of colloidal size to be separated, target output volume, target input volume injected, viscosity of input fluid, concentration of colloid(s), pressure set point, etc., on the user interface 810. The controller 808 is configured to operate the machine 500 in accordance with the selected operating parameters. The operator starts the automated machine 500 running by selecting run, and/or the machine 500 starts running automatically after the desired operating parameters are set.

In response to receiving the operating parameters via the user interface 810, the controller 808 turns on the air pump 804 and monitors the pressure using the pressure sensor 802 to tune (increase and/or decreasing) the pump rate to the desired set point. The pump 804 compresses the air in the cartridge 100 to the set pressure and then turns off. The pump 804 can be pump compressed air into the compressed air tank 806 before the air flows to the automated machine 500. The compressed air pressure drives the sample fluid 404 into the nanofluidic module 300 within the cartridge 100. The resultant flow of sample fluid 404 in the nanofluidic network of the nanofluidic module 300 provides the work energy for effecting separation of colloids. The nanoDLD arrays 702 (or similar nanostructure) in the nanofluidic module 300 separate the colloids in the flowing sample fluid 404 into two or more streams, based on size. This is governed by the details of the nanoDLD design.

The separated colloid streams are split into separate channels in the nanofluidic module 300 and routed to nanofluidic output ports 204 of the nanofluidic module 300. The separated colloid fractions emit from the nanofluidic output ports 204 of the nanofluidic module 300 and collect in the output ports 112 and 114 of the cartridge 100. In this design, the two outer nanofluidic output ports 204 of the nanofluidic module 300 outputs to the waster output ports 114, while the center nanofluidic output port 204 outputs the separated output port 112.

The pressure sensor 802 monitors the pressure in the cartridge 100 during processing, and if the pressure drops below the predefined threshold (for example, below the set point), the controller 808 turns on the pump 804 to restore pressure. The processing continues until the system 500 runs for the desired amount of time. The controller 808 alerts the user via flashing lights, a sounding alarm, and/or both that the run is over.

The operator can remove any sterile barriers on the output fluid ports 112 and 114 of the cartridge 100. The operator can then remove each separated fluid fraction individually from the output ports 112 and 114, for example, via syringe, pipet, and/or automated injector. The operator removes the cartridge 100 from the holder 400 and disposes of it, as well as any contaminated sealing material. The collected separated fractions can then be used for any additional preparative or analytical steps.

Figure 9:
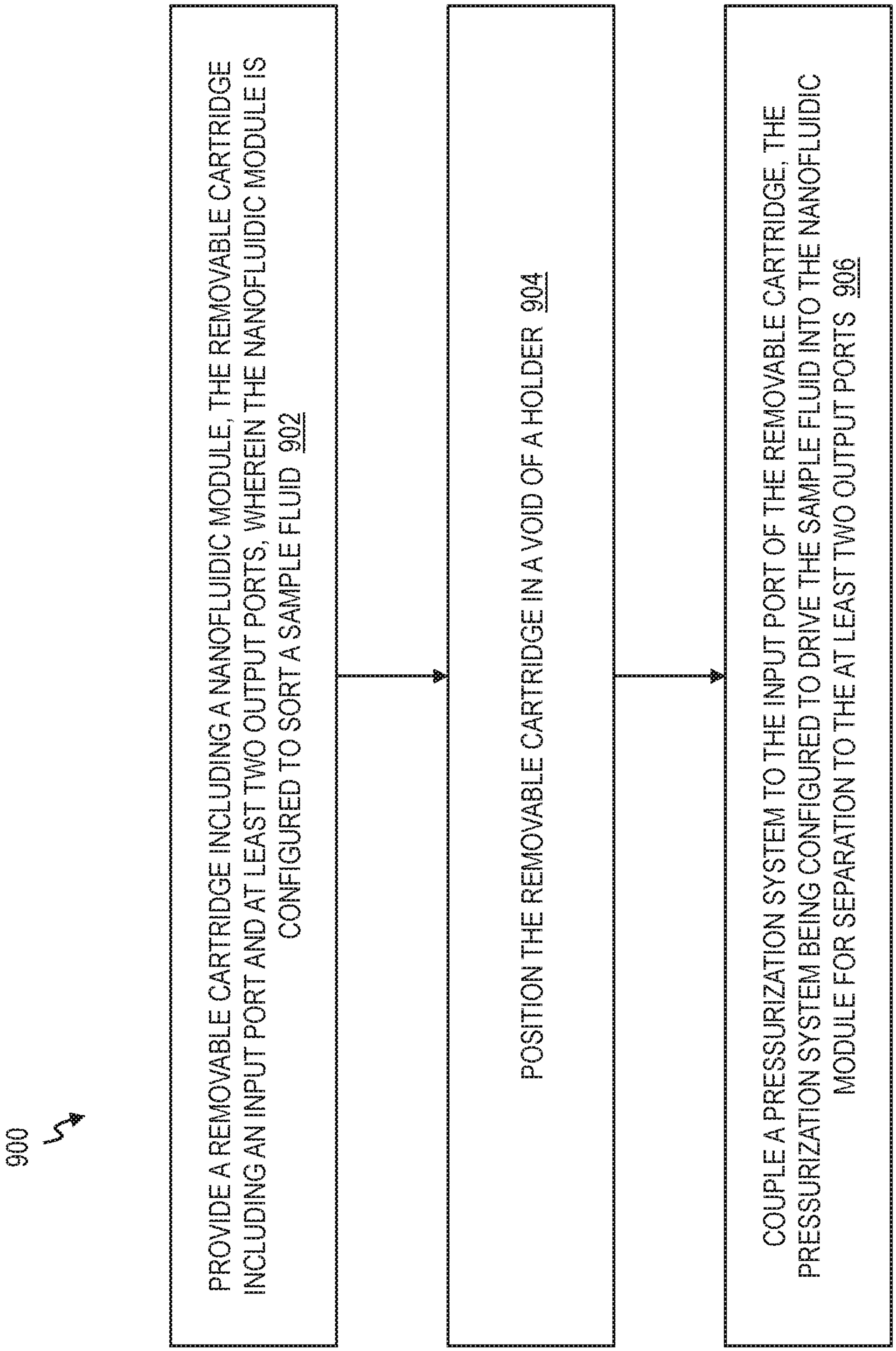
FIG. 9 is a flow chart of a method of configuring an apparatus according to embodiments of the invention.

FIG. 9 is a flow chart 900 of a method of configuring an apparatus 500 according to embodiments. At block 902, a removable cartridge 100 including a nanofluidic module 300 is provided, where the removable cartridge 100 includes an input port 102 and at least two output ports (for example, at least one separation output port 112 and one waste output port 114), where the nanofluidic module 300 is configured to sort a sample fluid 404. At block 904, the removable cartridge 100 is configured to be positioned in a void of a holder 400. At block 906, a pressurization system 820 is coupled to the input port 102 of the removable cartridge 100, and the pressurization system 820 is configured to drive the sample fluid into the nanofluidic module 300 for separation to the at least two output ports 112 and 114.

The pressurization system 820 includes a pump 804 and a pressurized tank 806 in order to drive the sample fluid through the nanofluidic module 300, and the pump 804 is configured to be controlled according to predefined operating parameters and the pump 804 is not manually driven (i.e., not a syringe pressed by a user).

The pressurization system 820 includes connection ports, where the connection ports have a first connection port 604 configured to receive air and a second connection port 606 configured to expel the air after being pressurized to the input port 102 of the removable cartridge 100. In an implementation, the manifold 650 can be part of the pressurization system 820. The pressurization system 820 is coupled to a pressure sensor 802, where the pressure sensor 802 is configured to monitor pressure received by the removable cartridge 100. The pressure sensor 802 can be in the manifold 650, in the line 450 connecting the manifold 650 to the air inlet port 512, and/or in a line from the compressed air tank 806 to the manifold 650. A controller 808 is configured to control a pressure of the air driven into the removable cartridge 100.

A user interface 810 is configured to receive operating parameters from a user. The controller 808 is connected to the user interface 810, and the controller 808 is configured to control operation of a pump 804 of the pressurization system 820 according to the operating parameters and according to feedback from the pressure sensor 802. The nanofluidic module 300 sealably couples to the cartridge 100, and the nanofluidic module 300 includes one or more nano-deterministic lateral displacement (DLD) arrays.

The holder 400 includes supports 504 that create the void such that the removable cartridge 100 fits between the supports 504. The holder 400 includes a top lid 506 having an air inlet port 512 connected to a feed line 514, and the top lid 506 sealably connects to the input port 102 of the removable cartridge 100 such that air from the pressurization system 820 is driven into the air inlet port 512 of the top lid 506 to the input port 102 of the removable cartridge via the feed line 514.

The holder 400 is configured to operate with other removable cartridges 100 that have different configurations from the removable cartridge 100. The other removable cartridges are selected from the group consisting of: a first removable cartridge having multiple nanofluidic modules 300, a second removable cartridge having multiple nanofluidic modules 300 in parallel, thereby increasing a fluid flow of the sample fluid as compared to the removable cartridge not having multiple nanofluidic modules 300 in parallel, a third removable cartridge having multiple nanofluidic modules in series, thereby further separating the sample fluid as compared to the removable cartridge not having multiple nanofluidic modules in series, and a fourth removable cartridge having multiple nanofluidic modules 300 and having more than the at least two output ports, such that the sample fluid is separated into more fractions than the removable cartridge, and combinations of the first, second, third, and fourth removable cartridges.

Figure 10:
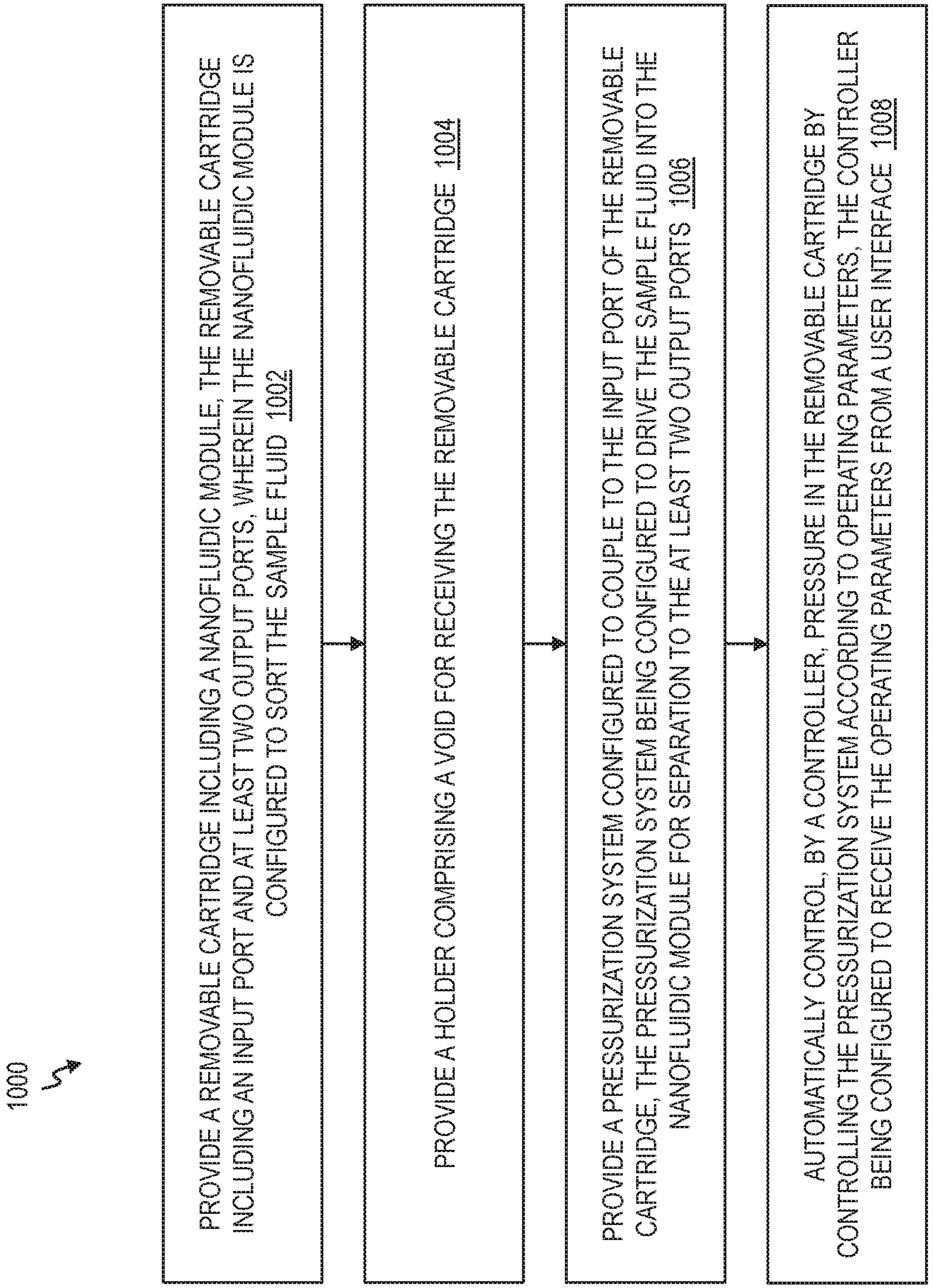
FIG. 10 is flow chart of a method of an automated machine for separating sample fluid according to embodiments of the invention.

FIG. 10 is flow chart 1000 of a method of an automated machine 500 for separating sample fluid according to embodiments. At block 1002, a removable cartridge including a nanofluidic module 300 is provided, and the removable cartridge 100 includes an input port 102 and at least two output ports 112 and 114, where the nanofluidic module 300 is configured to sort the sample fluid. At block 1004, a holder 400 comprising a void for receiving the removable cartridge 100 is provided. At block 1006, a pressurization system 820 is configured to couple to the input port 102 of the removable cartridge 100, where the pressurization system 820 is configured to drive the sample fluid into the nanofluidic module 300 for separation to the at least two output ports 112, 114. At block 1008, the controller 808 is configured to automatically control pressure in the removable cartridge 100 by controlling the pressurization system 802 according to operating parameters, where the controller 808 is configured to receive the operating parameters from a user interface 810.

Figure 11A:
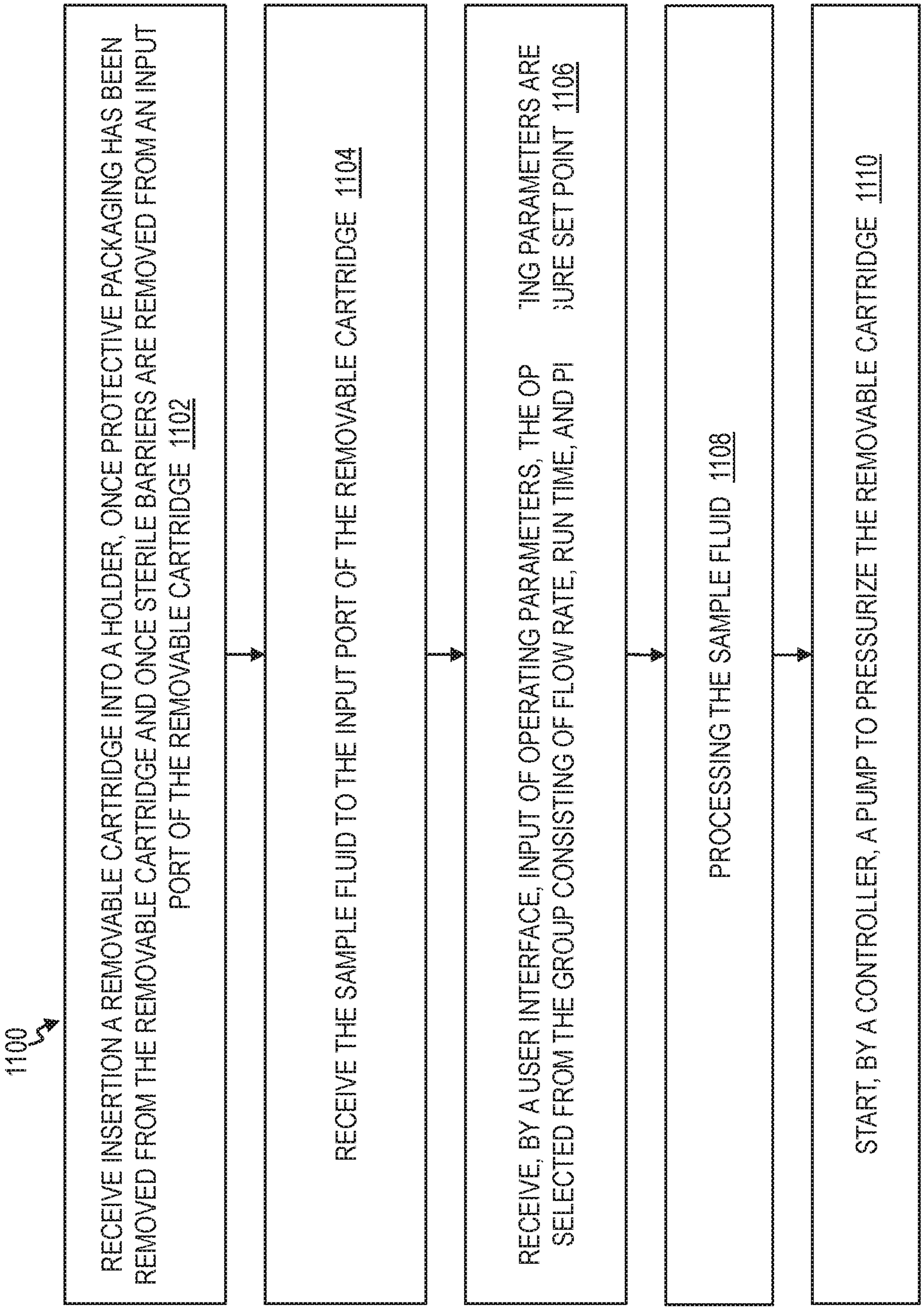
FIG. 11A is a flow chart of a method of operating an automated machine for separating sample fluid according to embodiments of the invention.
Figure 11B:
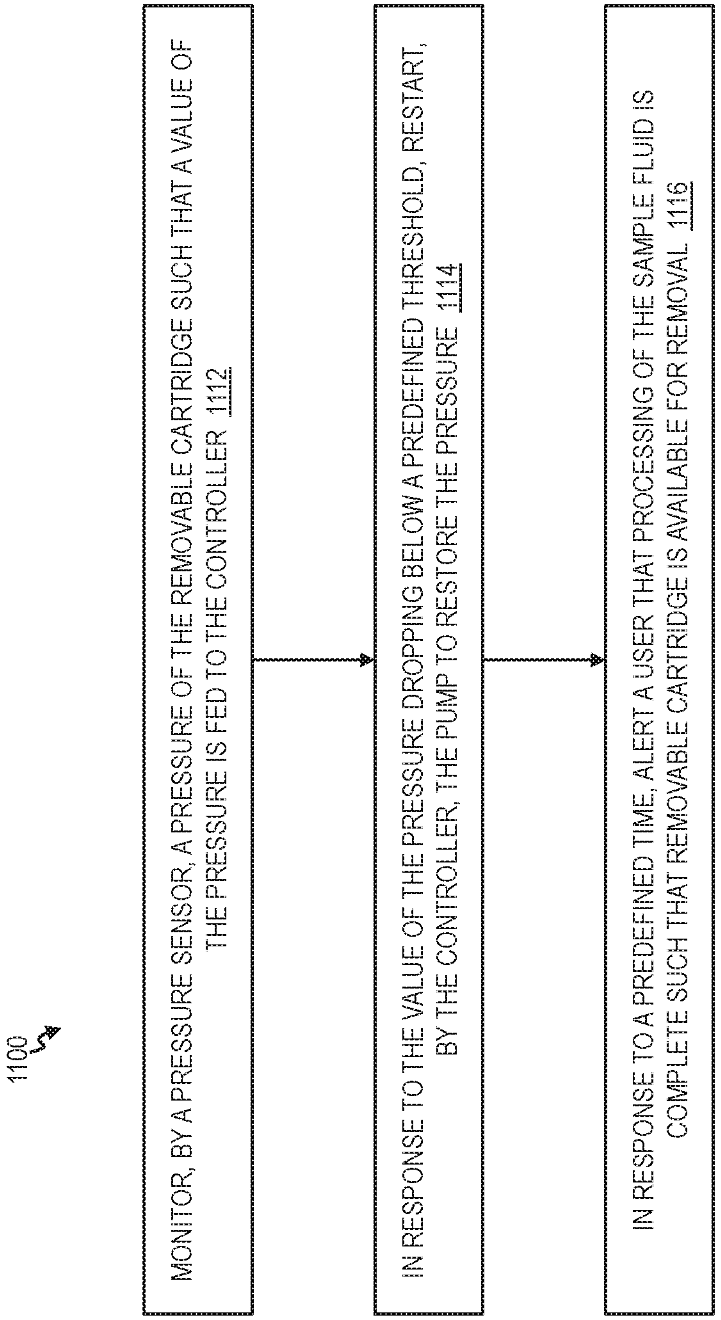
FIG. 11B continues the flow chart of FIG. 11A according to embodiments of the invention.

FIG. 11A is a flow chart 1100 of a method of operating an automated machine 500 for separating sample fluid according to embodiments. FIG. 11B is a continuation of the flow chart 1100 in FIG. 11A. At block 1102, the automated machine 500 is configured to receive insertion of a removable cartridge 100 into a holder 400, once protective packaging has been removed from the removable cartridge 100 and once sterile barriers are removed from an input port 102 of the removable cartridge 100. At block 1104, the automated machine 500 is configured to receive the sample fluid to the input port 102 of the removable cartridge 100. At block 1106, the automated machine 500 is configured to receive, by a user interface 810, input of operating parameters, where the operating parameters are selected from the group consisting of flow rate, run time, and pressure set point.

At block 1108, automated machine 500 is configured to execute processing the sample fluid. The automated processing by the automated machine 500 includes starting, by a controller 808, a pump 804 to pressurize the removable cartridge 100 (at block 1110), monitoring, by a pressure sensor 802, a pressure of the removable cartridge 100 such that a value of the pressure is fed to the controller 808 (at block 1112), in response to the value of the pressure dropping below a predefined threshold, restarting, by the controller 808, the pump 804 to restore the pressure (at block 1114), and in response to a predefined time, alerting a user that processing of the sample fluid is complete such that removable cartridge 100 is available for removal (at block 1116).

Technical effects and benefits include a structure and method for continuous processing of complex solutions of bio-colloids (e.g., particles of diameters 10 nm or greater) to separate the colloids into two or more output streams based on particle size. Technical benefits further include well-defined separation medium for sample processing, e.g., microfabricated nanoDLD arrays, ability for continuous sample processing, and lower energy input and system complexity compared to ultracentrifuge and a majority of chromatography methods. Technical benefits include no chemical additives (e.g., precipitants, detergents) needed to operate, thereby reducing possibility of contamination or aggregation of colloids. Additionally, the structure and method can operate on relevant bio-colloids (exosomes and other lipid vesicles), nucleic acids, large macromolecules, protein complexes, organelles, protein capsids and compartments, spores, pollen, cells, nanocrystals, and crystallites. The reduced footprint of the structure enables portability, for mobile and remote operation applications.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of operating an automated machine for separating sample fluid, the method comprising:

receiving insertion of a removable cartridge into a holder, the removable cartridge comprising one or more nano-deterministic lateral displacement (DLD) arrays, wherein the holder comprises supports that create a void such that the removable cartridge fits between the supports, the supports being coupled to a platform, the holder comprising an air inlet port and a channel;

receiving the sample fluid at an input port of the removable cartridge;

receiving, by a user interface, input of operating parameters for operating a controller; and processing the sample fluid, the processing including:

starting, by the controller, a pump to pressurize the removable cartridge via the air inlet port;

monitoring, by a pressure sensor, a pressure of the removable cartridge such that a value of the pressure is fed to the controller; and in response to the value of the pressure dropping below a predefined threshold, restarting, by the controller, the pump to increase the pressure via the channel of the holder.

2. The method of claim 1, wherein the removable cartridge comprises a nanofluidic module such that the one or more DLD arrays are in the nanofluidic module.

3. The method of claim 2, wherein the nanofluidic module comprises a particle counter sensor.

4. The method of claim 3, wherein the particle counter sensor is configured to monitor input particle streams.

5. The method of claim 3, wherein the particle counter sensor is configured to monitor output particle streams.

6. The method of claim 1, wherein the removable cartridge comprises the input port and at least two output ports.

7. The method of claim 6, wherein the pump is part of a pressurization system configured to couple to the input port of the removable cartridge.

8. The method of claim 7, wherein the pressurization system is configured to drive the sample fluid into a nanofluidic module of the removable cartridge for separation into the at least two output ports.

9. The method of claim 7, wherein the pressurization system includes the pump and a pressurized tank configured to drive the sample fluid through a nanofluidic module of the removable cartridge, the pressurization system being coupled to the input port of the removable cartridge.

10. The method of claim 1, wherein:

the pump is part of a pressurization system comprising connection ports, the connection ports having a first connection port configured to receive air and a second connection port configured to expel the air to the input port of the removable cartridge; and the controller is configured to control the pressure of the air driven into the removable cartridge.

11. The method of claim 1, wherein the holder is configured to operate with another removable cartridge comprising a plurality of nanofluidic modules and having more than two output ports.

12. A method of operating an automated machine for separating sample fluid, the method comprising:

receiving insertion of a removable cartridge into a holder, wherein the holder comprises supports that create a void such that the removable cartridge fits between the supports, the supports being coupled to a platform, the holder comprising a channel;

receiving the sample fluid at an input port of the removable cartridge;

receiving, by a user interface, input of operating parameters for operating a controller; and processing the sample fluid, the processing including:

starting, by the controller, a pump to pressurize the removable cartridge;

monitoring, by a pressure sensor, a pressure of the removable cartridge such that a value of the pressure is fed to the controller;

in response to the value of the pressure dropping below a predefined threshold, restarting, by the controller, the pump to increase the pressure via the channel of the holder; and alerting a user that processing of the sample fluid is complete such that the removable cartridge is available for removal, wherein the removable cartridge comprises a nanofluidic module, the nanofluidic module comprising one or more nano-deterministic lateral displacement (DLD) arrays.

13. A method of operating an automated machine for separating sample fluid, the method comprising:

receiving insertion of a removable cartridge into a holder;

receiving the sample fluid at an input port of the removable cartridge;

receiving, by a user interface, input of operating parameters; and processing the sample fluid, the processing including:

starting, by a controller, a pump to pressurize the removable cartridge;

monitoring, by a pressure sensor, a pressure of the removable cartridge such that a value of the pressure is fed to the controller;

in response to the value of the pressure dropping below a predefined threshold, restarting, by the controller, the pump to increase the pressure; and alerting a user that processing of the sample fluid is complete such that the removable cartridge is available for removal;

wherein the holder comprises supports that create a void such that the removable cartridge fits between the supports; and wherein the holder comprises a top lid having an air inlet port connected to a feed line, the top lid sealably connects to the input port of the removable cartridge such that air from the pump is driven through the air inlet port of the top lid to the input port of the removable cartridge via the feed line.

* * * * *